(12) United States Patent
Dalwadi (10) Patent No.: US 10,243,410 B2
(45) Date of Patent: Mar. 26, 2019

(54) ELECTRONIC DEVICE AND POWER MANAGEMENT METHOD

(71) Applicant: NXP B.V., Eindhoven (NL)

(72) Inventor: Jaydeep Girishkumar Dalwadi, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/789,929

(22) Filed: Oct. 20, 2017

(65) Prior Publication Data

US 2018/0115195 A1   Apr. 26, 2018

(30) Foreign Application Priority Data

Oct. 20, 2016   (EP) .................................... 16194743

(51) Int. Cl.
*G06K 7/10* (2006.01)
*H02M 7/08* (2006.01)
*G06K 19/07* (2006.01)
*H02J 50/20* (2016.01)
*H02M 7/217* (2006.01)

(52) U.S. Cl.
CPC .......... *H02J 50/20* (2016.02); *G06K 7/10158* (2013.01); *G06K 19/0709* (2013.01); *G06K 19/0712* (2013.01); *G06K 19/0715* (2013.01); *H02M 7/08* (2013.01); *H02M 7/217* (2013.01)

(58) Field of Classification Search
CPC ............. G06K 7/10366; G06K 7/0008; G06K 19/0723; G06K 7/10009; G06K 7/10297; G06K 19/07749; G06K 7/01
USPC ...................................................... 340/10.5
See application file for complete search history.

(56) References Cited

U.S. PATENT DOCUMENTS 6,127,799 A * 10/2000 Krishnan ........... G06K 19/0701
320/104
6,289,237 B1 * 9/2001 Mickle ................. A61B 5/0002
600/509

(Continued)

FOREIGN PATENT DOCUMENTS

WO   2014/102768 A1   7/2014
WO   2016/055663 A1   4/2016

OTHER PUBLICATIONS

Extended European Search Report for Patent Appln. No. 16194743.7 (dated May 16, 2017).

(Continued)

*Primary Examiner* — Mark S Blouin (57) ABSTRACT

According to a first aspect of the present disclosure, an electronic device is provided, comprising: a first power extraction unit configured to extract a first amount of power from an RF field present on the RF antenna and to provide said first amount of power to one or more circuits of the electronic device; a second power extraction unit configured to extract a second amount of power from the RF field and to provide said second amount of power to an output of the electronic device; a control unit configured to control the second amount of power provided to said output. According to a second aspect of the present disclosure, a corresponding power management method for use in an electronic device is conceived. According to third aspect of the present disclosure, a corresponding non-transitory computer-readable medium comprising instructions is provided.

13 Claims, 5 Drawing Sheets

(56) References Cited

U.S. PATENT DOCUMENTS

| | | | |
|---|---|---|---|
| 6,373,447 B1* | 4/2002 | Rostoker | G06K 19/07749 |
| | | | 257/491 |
| 6,615,074 B2* | 9/2003 | Mickle | G06K 7/0008 |
| | | | 600/509 |
| 7,084,605 B2 | 8/2006 | Mickle et al. | |
| 7,268,517 B2* | 9/2007 | Rahmel | H02J 17/00 |
| | | | 320/101 |
| 7,598,792 B2* | 10/2009 | Liu | H02M 1/08 |
| | | | 327/494 |
| 8,035,335 B2 | 10/2011 | Duron et al. | |
| 2007/0281760 A1* | 12/2007 | Nikitin | H04B 1/385 |
| | | | 455/575.2 |
| 2011/0181399 A1 | 7/2011 | Pollack et al. | |
| 2012/0132710 A1 | 5/2012 | Loeffler et al. | |
| 2012/0223147 A1 | 9/2012 | Ohshima | |

OTHER PUBLICATIONS

"Dynamic NFC/RFID tag IC with 64-Kbit EEPROM, energy harvesting, $I^2C$ bus and ISO 15693 RF interface—M24LR64E-R" STMicroelectronics, 141 pgs. (Nov. 2014).

"AS3953A-14443 High Speed Passive Tag Interface", AMS, 70 pgs, retrieved from the internet at: www.ccmoss.com/eng/content/download/325044/.../AS3953_DS000383_1-00.pdf (Dec. 28, 2015).

* cited by examiner

ELECTRONIC DEVICE AND POWER MANAGEMENT METHOD

CROSS-REFERENCE TO RELATED APPLICATIONS

This application claims the priority under 35 U.S.C. § 119 of European patent application no. 16194743.7, filed on Oct. 20, 2016, the contents of which are incorporated by reference herein.

FIELD

The present disclosure relates to an electronic device. Furthermore, the present disclosure relates to a power management method for use in an electronic device, and to a corresponding non-transitory computer-readable medium.

BACKGROUND

Electronic devices such as radio frequency identification (RFID) or near field communication (NFC) tags often include an integrated circuit (tag circuit) coupled to a radio frequency (RF) antenna. The integrated circuit may receive data and energy (power) through the RF antenna. In particular, the integrated circuit may be powered by the field, i.e. the power required for its operation may be extracted from the RF field present on the RF antenna.

SUMMARY

According to a first aspect of the present disclosure, an electronic device is provided, comprising: a first power extraction unit configured to extract a first amount of power from an RF field present on the RF antenna and to provide said first amount of power to one or more circuits of the electronic device; a second power extraction unit configured to extract a second amount of power from the RF field and to provide said second amount of power to an output of the electronic device; a control unit configured to control the second amount of power provided to said output.

In one or more embodiments, the output is an output pin for supplying the second amount of power to an external device.

In one or more embodiments, the control unit is configured to control the second amount of power provided to the output in dependence on the strength of the RF field.

In one or more embodiments, the device is a radio frequency identification tag or a near field communication tag.

In one or more embodiments, the second power extraction unit is an energy harvesting circuit.

In one or more embodiments, the second power extraction unit comprises a plurality of diodes and the control unit is configured to control the second amount of power provided to the output by sinking current from said diodes.

In one or more embodiments, the control unit is configured to sink the current from the diodes in dependence on a control voltage that is based on the difference between a rectified supply voltage for said circuits and a reference supply voltage for said circuits.

In one or more embodiments, the control unit comprises a current mirror configured to multiply the current sunk from the diodes.

In one or more embodiments, the control unit comprises a limiter configured to sink an excess current on the output to ground.

In one or more embodiments, a system comprises an electronic device of the kind set forth and a powered device coupled to the output of the electronic device.

According to a second aspect of the present disclosure, a power management method is conceived for use in an electronic device, the method comprising: extracting, by a first power extraction unit of the electronic device, a first amount of power from a radio frequency (RF) field present on an RF antenna and providing said first amount of power to one or more circuits of the electronic device; extracting, by a second power extraction unit of the electronic device, a second amount of power from the RF field and providing said second amount of power to an output of the electronic device; controlling, by a control unit of the electronic device, the second amount of power provided to said output.

In one or more embodiments, said controlling comprises controlling the second amount of power provided to the output in dependence on the strength of the RF field.

In one or more embodiments, said controlling comprises sinking current from a plurality of diodes of the second power extraction unit.

In one or more embodiments, said controlling comprises sinking, by a limiter of the control unit, an excess current on the output to ground.

According to a third aspect of the present disclosure, a non-transitory computer-readable medium is provided, comprising executable instructions which, when executed, carry out or control a method of the kind set forth.

DESCRIPTION OF DRAWINGS

Embodiments will be described in more detail with reference to the appended drawings, in which.

DESCRIPTION OF EMBODIMENTS

Figure 1:
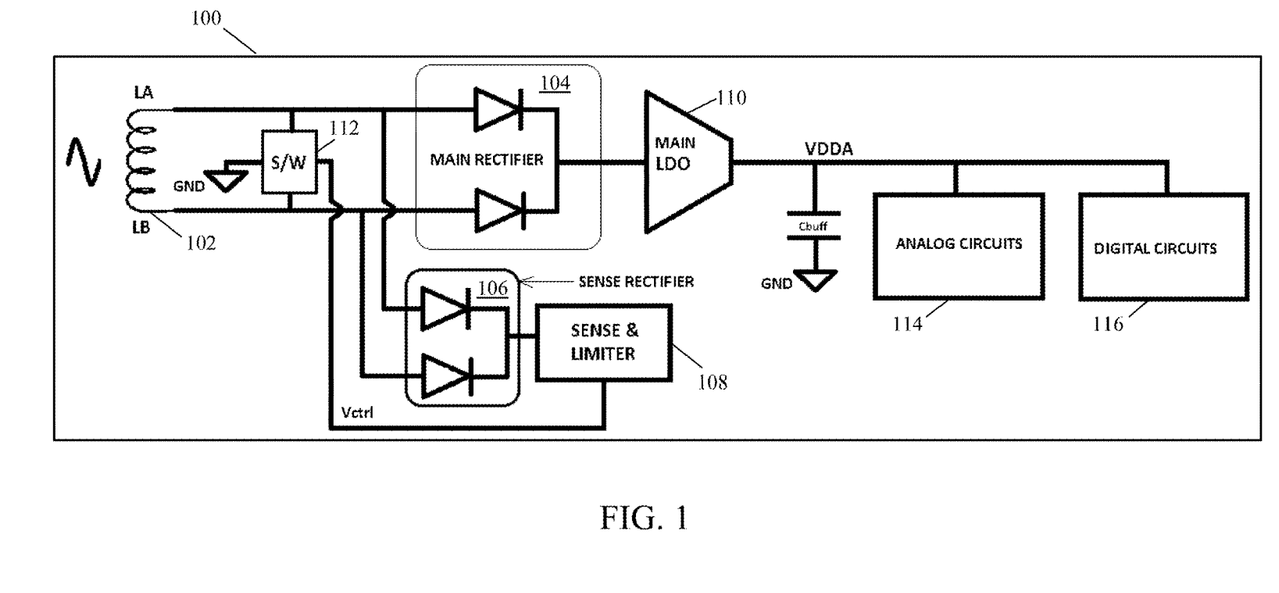
FIG. 1 shows an example of an RFID tag.

FIG. 1 shows an example of an RFID tag 100. In particular, it shows an example of a system included in an RFID tag 100. The RFID tag 100 comprises an RF antenna 102 operatively coupled to a main rectifier 104 and a sense rectifier 106. The main rectifier 104 is operatively coupled to a main low-dropout regulator (LDO) 110, which is configured to supply a voltage VDDA to analog circuits 114 and digital circuits 116 of the tag 100. The sense rectifier 106 is operatively coupled to a sense and limiter block 108. The sense and limiter block 108 is operatively coupled to switches 112. The RF antenna 102 is connected to the other components of the tag 100 (i.e., to the tag's integrated circuit) through antenna pins LA and LB. The main rectifier 104 is configured to rectify the RF field present on the RF antenna 102 and to supply a rectified voltage to the main LDO 110. The main LDO 110 is configured to supply voltage VDDA to the internal system, i.e. to the analog 114 and digital 116 circuits. The sense and limiter block 108 is configured to sense the rectified output voltage from the diodes in the sense rectifier 106 and to maintain the voltage on the antenna pins LA and LB within a maximum absolute voltage rating of the RF front-end. The RF front-end comprises all circuits connected to the antenna pins LA and LB.

As mentioned above, the power required for operating the analog circuits 114 and digital circuits 116 of the tag 100 may be extracted from the RF field present on the RF antenna 102. The internal system of the tag 100 (i.e. the analog 114 and digital 116 circuits) usually consumes an amount of power between a few tens of microamperes to a couple of hundred microamperes. The RF field available can vary from about 0.15 A/m to 12 A/m (according to the standard ISO 15693) to 1.5 A/m to 18 A/m (according to the standard ISO 14443). That is to say, more current can often be extracted from the RF field than is required for operating the internal system of the tag 100, and consequently some current is wasted. As shown in FIG. 1, a typical RFID tag 100 comprises a main rectifier 104 followed by main LDO 110 which generates a power supply for the internal system. Parallel to the main rectifier 104 there is a sense rectifier 110, whose output is used by a sense and limiter circuit 108 which drives the gate control of switches 112 used to sink current from LA and LB to GND in order to maintain the voltage on LA and LB within a maximum absolute voltage rating of the circuits connected to antenna 102.

Figure 2:
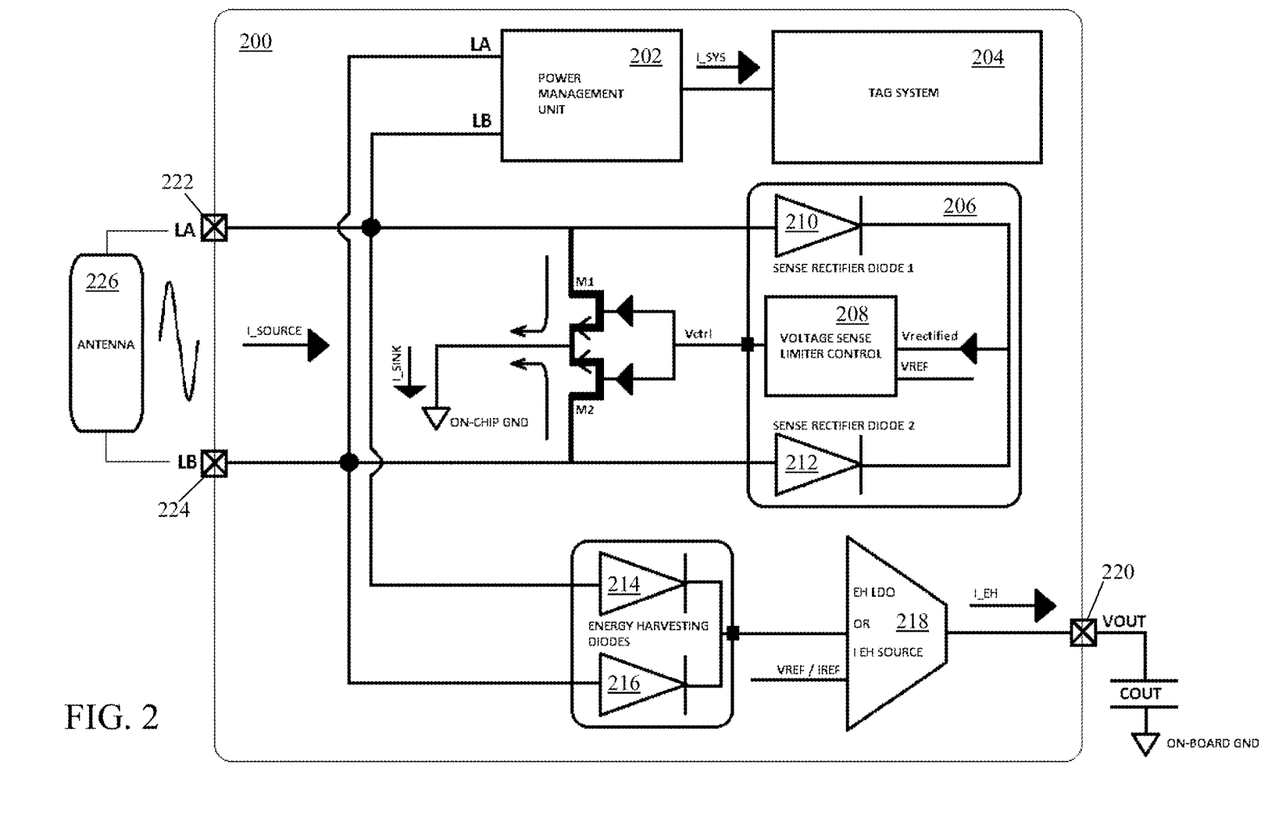
FIG. 2 shows an example of an RFID tag comprising an energy harvesting function.

FIG. 2 shows an example of an RFID tag comprising an energy harvesting function. The tag comprises an integrated circuit 200 coupled to an RF antenna 226 through antenna terminals 222, 224 (i.e., antenna pins LA and LB). The integrated circuit 200 comprises a power management unit 202 operatively coupled between the antenna terminals 222, 224 and a tag system 204. The tag system 204 may comprise analog circuits and digital circuits powered by the power management unit 202. The power management unit may extract a first amount of power required for operating the tag system 204 from the RF field present on the RF antenna 226. In particular, an RF field which is present on the antenna 102 may result in a voltage present between the terminals 222, 224, and the power management unit 202 may rectify said voltage and provide a supply voltage or current corresponding to the rectified voltage to the tag system 204. Furthermore, the integrated circuit 200 comprises a sense and limiter block 206, which in turn comprises sense rectifier diodes 210, 212 and a voltage sense limiter control block 208. In addition to extracting a first amount of power from the field for powering the tag's internal system 204, the integrated circuit 200 is capable of extracting a second amount of power from the RF field through energy harvesting diodes 214, 216. The energy harvesting diodes 214, 216 are operatively coupled to an energy harvesting LDO or an energy harvesting current source 218. The energy harvesting LDO or an energy harvesting current source 218 is configured to provide a voltage or current corresponding to the second amount of power to an output terminal or pin 220 of the integrated circuit 200. Thus, the second amount of power extracted from the RF field may be used to supply power to an external device (not shown).

In FIG. 2, I_SOURCE represents source current provided by the RF field. The whole tag 200, including the energy harvesting function, should in one embodiment work within this limit. Furthermore, I_SYS represents the current required for operating the tag system 204 (i.e., the analog and digital circuits). Furthermore, I_SINK represents the current sunk between terminals LA and LB in order to maintain the voltage between LA and LB within a maximum absolute voltage rating for reliably operating the RF front-end (i.e., the circuits connected to terminals LA and LB). Note that the on-chip ground is eventually connected to the ground pin (not shown) of the whole tag 200 which is ultimately connected to on-board ground. Furthermore, I_EH represents the load current required by an on-board circuit of an external device (not shown) in order to operate using the energy harvesting output. As mentioned, block 218 may either be an LDO or a fixed current source. In operation, the energy harvesting diodes 214, 216 rectify the voltage on terminals LA and LB and supply the rectified voltage to an LDO 218, which in turn generates a regulated voltage at the output pin 220. In case of a VOUT drop or overshoot, the LDO 218 tries to source/sink more current to/from VOUT. Another architecture may use a fixed current source 218 coupled to the output pin 220. For example, the current source 218 may be a current mirror that uses a constant current source reference IREF and puts a fixed current on the output pin 220 under any RF field condition.

In one example embodiment, in order to achieve a correct operation of an RFID tag with an energy harvesting function, it is important to make sure that the internal supply does not fall due to either a field reduction or an increase in energy harvesting load current. That is to say, the RFID tag should not stop performing its primary functions (e.g., responding to an external reader) due to external conditions. However, existing energy harvesting RFID tags have some disadvantages.

Case 1:

An energy harvesting LDO (referred to as EH LDO herein), usually tries to regulate VOUT under all field and all load conditions. This has the following disadvantages:

For a given fixed load current on VOUT, as the field decreases, the EH LDO doesn't adapt to a lower field. This means that, although the VOUT drops, the LDO tries to pull the same current from LA and LB in order to regulate VOUT. But in doing so, it eventually ends up pulling down LA and LB (due to reduced RF field) and ultimately the main internal LDO output (voltage VDDA), which is power supplied to the tag's internal system, falls down. This, in turn, may cause a reset of the internal system and an interruption of the on-going communication of the tag with an external reader, for example.

For a fixed RF field, when the load current increases beyond the capacity of the RF field, there will be a drop in VOUT which the EH LDO will try to correct by pulling up VOUT. However, again in doing so it will pull down LA and LB and eventually the internal supply (VDDA) to the tag's internal system will fall. This, in turn, may cause a reset of the internal system and an interruption of the on-going communication of the tag with an external reader, for example.

Moreover, implementing a current limit which is proportional to the available RF field is very complex as the EH LDO has to very quickly adapt to changing conditions.

Case 2:

A fixed current source on VOUT pin has the following disadvantages:

Since this technique uses a fixed current source, the amount of current put on VOUT (sourced from LA and LB) doesn't change with the field.

This technique works well at certain high field strengths at which the I_SOURCE from the RF field (i.e., LA and LB) is sufficiently high to supply the tag's internal system as well as the energy harvesting load current.

Summarizing, the main disadvantage of all available techniques is the fact that in existing energy harvesting architectures the output current is not internally limited by the available RF field. This, in turn, may cause over-loading of the RF field by the energy harvesting block and consequently the tag may experience frequent resets whenever the load current on VOUT increases and the RF field is weak.

Therefore, according to a first aspect of the present disclosure, an electronic device is provided, comprising: a radio frequency (RF) antenna; a first power extraction unit configured to extract a first amount of power from an RF field present on the RF antenna and to provide said first amount of power to one or more circuits of the electronic device; a second power extraction unit configured to extract a second amount of power from the RF field and to provide said second amount of power to an output of the electronic device; a control unit configured to control the second amount of power provided to said output. By controlling the second amount of power provided to the output, it can be ensured that the amount of power provided to the circuits of the electronic device (i.e., the first amount of power) remains sufficiently high. For example, in case the electronic device is an RFID tag or NFC tag, by controlling the second amount of power provided to the output, it can be ensured that the amount of power provided to the tag's internal system (e.g., analog and digital circuits) remains sufficiently high. For example, the second power extraction unit may be an energy harvesting circuit configured to extract the second amount of power from the RF field, with the purpose of powering an external device.

Thus, an architecture is presented which aims at ensuring that an NFC or RFID tag having a so-called energy-harvesting function does not malfunction, even under load current fluctuations on the energy-harvesting output (e.g. because the internal power supply of the tag falls as a result of an RF field reduction or an increase in Energy Harvesting load current). Energy harvesting refers to the use of un-utilized extra energy extracted by a tag from an RF field to power external devices (in addition to the tag itself). Usually tags have limiters which sink any additional current which is not utilized by the tags and keep the antenna voltages within the reliability limits of the CMOS technology used for the RF frontend. In accordance with the present disclosure, this additional current is diverted to the energy-harvesting output of the tag, thereby performing a limiter function as well as providing the complete quantity of extra current un-utilized by the tag to power external devices through an output pin along with a very stable regulated output voltage. In particular, the following advantages may be achieved: 1) the internal tag functionality is completely isolated from any external load current fluctuation on the energy-harvesting output and hence this architecture achieves that on-going tag operations do not fail due to this external fluctuation; 2) a highly efficient energy-harvesting architecture may be realized by using all extra current for energy harvesting, which otherwise would have been wasted in a limiter; 3) the function of a limiter is performed, thus clamping antenna voltages to within permissible limits of the particular technology, thereby protecting the RF frontend; 4) following a change in the RF field the energy-harvesting block may immediately adapt to the available current capability.

In a practical and efficient implementation, the output of the electronic device is an output pin for supplying the second amount of power to an external device. For example, the external device may be a host device that is coupled to the electronic device through said output pin. Furthermore, in one or more embodiments, the control unit is configured to control the second amount of power provided to the output in dependence on the strength of the RF field. In this way, it can be avoided that the output current of an energy harvesting circuit (i.e., the second amount of power) is not internally limited by the available RF field. For instance, the second amount of power provided to the output may be made proportional to the strength of the RF field.

Figure 3:
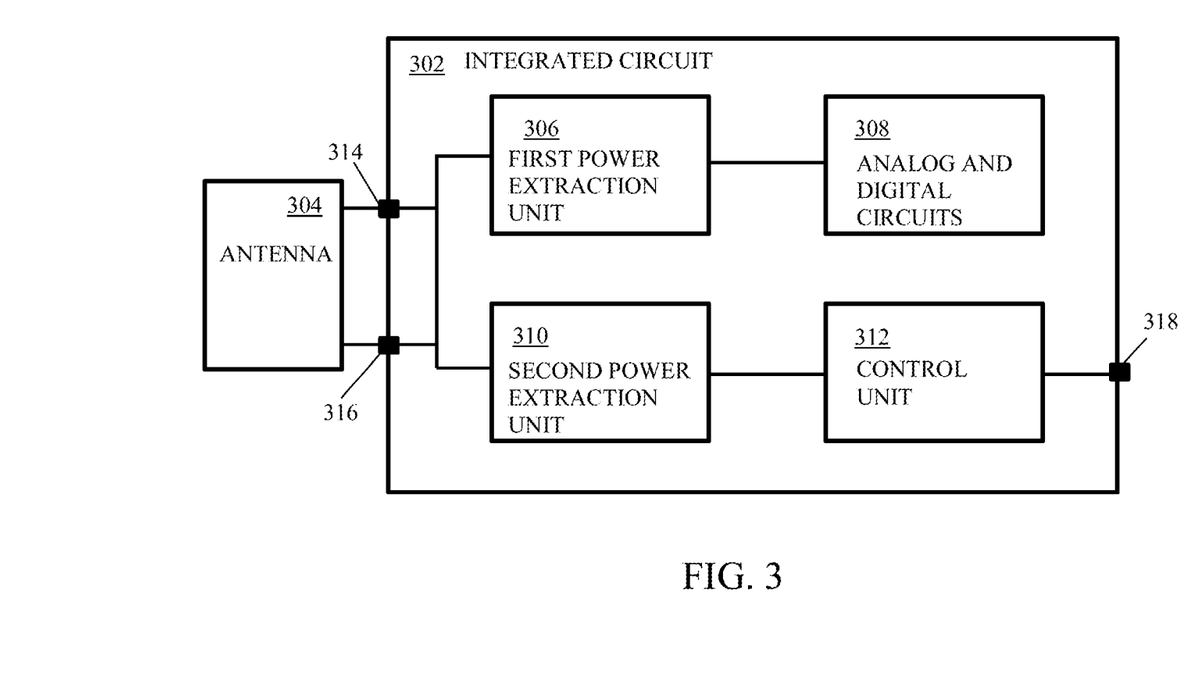
FIG. 3 shows an illustrative embodiment of an electronic device.

FIG. 3 shows an illustrative embodiment of an electronic device. The electronic device is in this example embodied as an integrated circuit (IC) 302. The electronic device (i.e., the IC 302) is operatively coupled to an RF antenna 304 through antenna terminals or pins 314, 316. In particular, a first power extraction unit 306 of the IC 302 is operatively coupled to the RF antenna 304, 316 through said pins 314, 316, and a second power extraction unit 310 of the IC 302 is operatively coupled to the RF antenna 304 through said pins 314, 316. The first power extraction unit 306 is configured to extract a first amount of power from the RF field present on the RF antenna 304 and to provide said first amount of power to analog and digital circuits 308 of the IC 302. The second power extract unit 310 is configured to extract a second amount of power from the RF field present on the RF antenna 304 and to provide said second amount of power to an output pin 318 of the IC 302. Furthermore, the IC 302 comprises a control unit 312 that is configured to control the second amount of power provided to the output pin 318.

Figure 4:
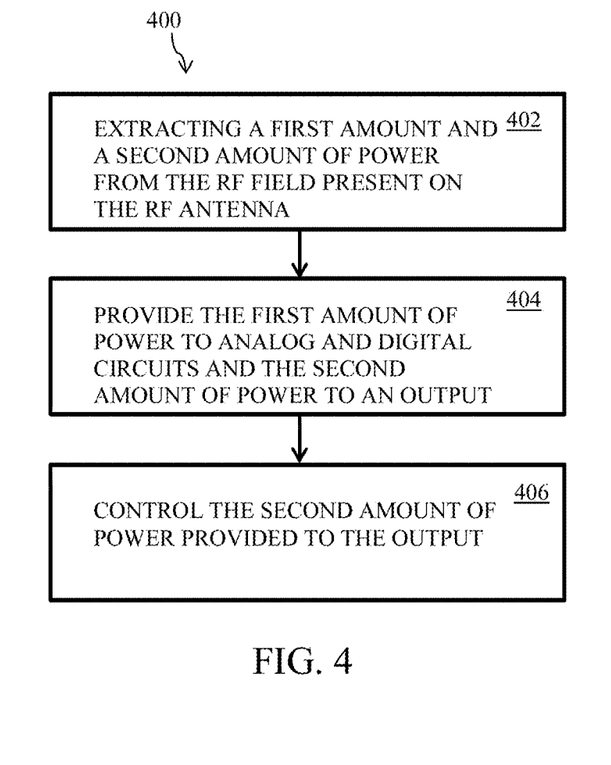
FIG. 4 shows an illustrative embodiment of a power management method for use in an electronic device.

FIG. 4 shows an illustrative embodiment of a power management method 400 for use in an electronic device of the kind set forth. The power management method 400 comprises, at 402, extracting a first amount of power and a second amount of power from the RF field present on the RF antenna 304. In particular, the first amount of power is extracted by the first power extraction unit 306 of the IC 302 and the second amount of power is extracted by the second power extraction unit 310 of the IC 302. Furthermore, the power management method 400 comprises, at 404, providing the first amount of power to the analog and digital circuits 308 of the IC 302, and providing the second amount of power to the output, in particular to output pin 318. In particular, the first amount of power is provided by the first power extraction unit 306 of the IC 302 and the second amount of power is provided by the second power extraction unit 310 of the IC 302. Furthermore, the power management method 400 comprises, at 406, controlling the second amount of power provided to the output. In particular, the second amount of power provided to the output is controlled by the control unit 312 of the IC 302.

Figure 5:
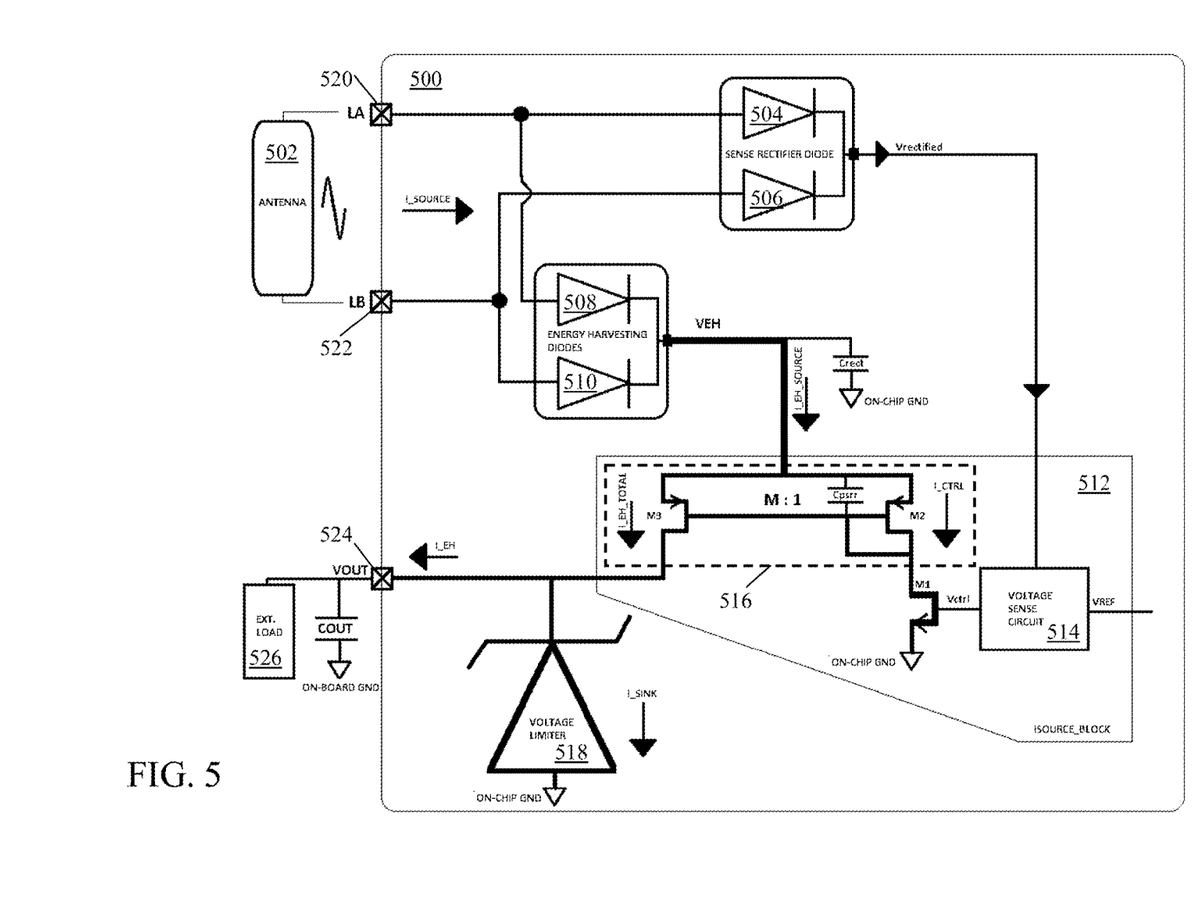
FIG. 5 shows an illustrative embodiment of an RFID tag.

FIG. 5 shows an illustrative embodiment of an RFID tag. In particular, it shows an example implementation of an electronic device of the kind set forth. The RFID tag comprises a tag circuit 500 (i.e., an integrated circuit) operatively coupled to an RF antenna 502 through antenna pins 520, 522. Furthermore, the tag circuit 500 is coupled to a powered device represented by an external load 526, through output pin 524. The tag circuit 500 comprises, in addition to a power management unit (not shown) and an internal system (not shown) as illustrated in FIG. 2, a couple of sense rectifier diodes 504, 506 and a couple of energy harvesting diodes 508, 510. Both the sense rectifier diodes 504, 506 and the energy harvesting diodes 508, 510 are operatively coupled to a current source block 512. The current source block 512 comprises a voltage sense circuit 514 that is configured to receive a rectified supply voltage from the sense rectifier diodes 504, 506. Furthermore, the current source block 512 comprises a current mirror 516 that includes transistors M2 and M3, and that is configured to receive an input current corresponding to a voltage VEH output by the energy harvesting diodes 508, 510. The tag circuit 500 also comprises a voltage limiter 518 operatively coupled between the current source block 512 and the output pin 524. Note that the on-chip ground is eventually connected to the ground pin (not shown) of the RFID tag 500 which is ultimately connected to on-board ground.

In FIG. 5, I_SOURCE represents the current provided by the available RF field, I_EH_SOURCE represents the overall energy harvesting, I_EH represents the load current consumed by an on-board load circuit on VOUT, I_SINK represents the
current sunk by the VOUT voltage limiter 518, I_EH_TOTAL represents the total current consumption of the energy harvesting output stage, and Vctrl represents the gate control voltage of transistor M1. The voltage Vctrl is output by the voltage sense circuit 514. The sense rectifier diodes 504, 506 are used to sense the voltage on LA and LB. Furthermore, the energy harvesting diodes 508, 510 are used to carry the overall current for the energy harvesting block. The voltage sense circuit 514 is used to sense the difference between the rectified voltage on LA/LB and a reference supply voltage VREF and to generate Vctrl in dependence on said difference.

In particular, the sense rectifier diodes 504, 506 generate a voltage Vrectified which is input to the voltage sense circuit 514. A reference VREF is generated based on the required maximum voltage LA and LB; this voltage VREF forms the second input of the voltage sense circuit 514. The difference between Vrectified and VREF is suitably amplified and applied as Vctrl to transistor M1. It is noted that instead of an amplifier a comparator may be used. The transistor M1 starts sinking current I_CTRL from the energy harvesting diodes 508, 510 through transistor M2, which may be a PMOS device. The current in transistor M2 is mirrored in current mirror 516 by a factor M through transistor M3 to the output pin 524. The current mirror 516 along with the voltage sense circuit 514 is referred to as current source block (ISOURCE_BLOCK) 512 as it sources a current which is proportional to the available RF field to the output pin 524. Furthermore, the function of the voltage limiter 518 is to sink any current in excess of the energy harvesting load requirement and by doing so, to regulate the voltage VOUT on the output pin 524 at the required value. With reference to FIG. 5, the current sunk by the voltage limiter 518 is equal to: I_SINK=I_EH_TOTAL−I_EH.

Thus, in a practical and efficient implementation, the second power extraction unit comprises a plurality of diodes (i.e., energy harvesting diodes 508, 510) and the control unit, which comprises a current source block 512 and a voltage limiter 518, is configured to control the second amount of power provided to the output (i.e., output pin 524) by sinking current from said diodes. Furthermore, in a practical and efficient implementation, the control unit is configured to sink the current from the diodes in dependence on a control voltage (Vctrl) that is based on the difference between a rectified supply voltage for the circuits of the tag (i.e., the voltage Vrectified generated by the sense rectifier diodes 504, 506) and a reference supply voltage for said circuits (VREF). Furthermore, in a practical and efficient implementation, the control unit comprises a current mirror (i.e., current mirror 516) configured to multiply the current sunk from the diodes (i.e., the energy harvesting diodes 508, 510). Furthermore, in a practical and efficient implementation, the control unit comprises a limiter (i.e., voltage limiter 518) that is configured to sink an excess current on the output (i.e., output pin 524) to ground.

It is noted that the sense rectifier diodes 504, 506 and the energy harvesting diodes 508, 510 may form part of classical diode-based rectifiers. The sense rectifier diodes 504, 506 do not require much area as they have to support the quiescent current of the voltage sense circuit 514. The energy harvesting diodes 508, 510 support the overall load current specified for the on-board load circuitry that is external to the tag (i.e., external load 526) in addition to the current I_SINK sunk in the VOUT voltage limiter 518. The voltage sense circuit 514 may be a fast high gain stage which amplifies the difference between VREF and Vrectified; the output of this stage drives an NMOS sinking current in the order of magnitude of a few microamperes. It is noted that the voltage sense circuit 514 may also be implemented as a comparator, which provides a fast response and good accuracy. The current mirror 516 multiplies the sensed current and draws it from the energy harvesting diodes 508, 510. The output of the energy harvesting diodes 508, 510 may be decoupled with a capacitance shown as Crect in FIG. 5 since, without capacitance, this output may have a big ripple. The current sourced out of the current mirror 516 transistor M3 may be ripple current. It may also be necessary to connect a capacitor from the gate of transistors M2 and M3 to their source; this capacitor performs the function of supply rejection and is shown as Cpsrr in FIG. 5. The mismatch of the current mirror 516 is not of concern here as the voltage Vctrl will eventually settle at a value such that LA/LB is clamped to the required voltage. The voltage limiter 518 is a circuit that clamps the output voltage VOUT and sinks any excessive current in order to regulate the output voltage VOUT. This voltage limiter circuit 518 may eventually sink more/less current based on the decrease/increase in the load current on the output pin 524. The voltage limiter circuit 518 may be implemented as a classical current-sink regulator.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an"

preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID tag
102 RF antenna
104 main rectifier
106 sense rectifier
108 sense and limiter block
110 main LDO
112 switches
114 analog circuits
116 digital circuits
200 integrated circuit
202 power management unit
204 tag system
206 sense and limiter block
208 voltage sense limiter control
210 sense rectifier diode
212 sense rectifier diode
214 energy harvesting diode
216 energy harvesting diode
218 energy harvesting LDO or energy harvesting current source
220 output pin
222 antenna pin
224 antenna pin
226 RF antenna
302 integrated circuit
304 RF antenna
306 first power extraction unit
308 analog and digital circuits
310 second power extraction unit
312 control unit
314 antenna pin
316 antenna pin
318 output pin
400 power management method
402 extracting a first amount and a second amount of power from the RF field present on the RF antenna
404 provide the first amount of power to analog and digital circuits and the second amount of power to an output
406 control the second amount of power provided to the output
500 tag circuit
502 RF antenna
504 sense rectifier diode
506 sense rectifier diode
508 energy harvesting diode
510 energy harvesting diode
512 current source block
514 voltage sense circuit
516 current mirror
518 voltage limiter
520 antenna pin
522 antenna pin
524 output pin
526 external load

The invention claimed is:

1. An electronic device comprising:
    a first power extraction unit configured to extract a first amount of power from an RF field present on an RF antenna and to provide said first amount of power to one or more circuits of the electronic device;
    a second power extraction unit configured to extract a second amount of power from the RF field and to provide said second amount of power to an output of the electronic device;
    a control unit configured to control the second amount of power provided to said output, wherein the control unit is configured to control the second amount of power provided to the output in dependence on the strength of the RF field.

2. The device of claim 1, wherein the output is an output pin for supplying the second amount of power to an external device.

3. The device of claim 1, being a radio frequency identification tag or a near field communication tag.

4. The device of claim 1, wherein the second power extraction unit is an energy harvesting circuit.

5. The device of claim 1, wherein the second power extraction unit comprises a plurality of diodes and the control unit is configured to control the second amount of power provided to the output by sinking current from said diodes.

6. The device of claim 5, wherein the control unit is configured to sink the current from the diodes in dependence on a control voltage that is based on the difference between a rectified supply voltage for said circuits and a reference supply voltage for said circuits.

7. The device of claim 5, wherein the control unit comprises a current mirror configured to multiply the current sunk from the diodes.

8. The device of claim 1, wherein the control unit comprises a limiter configured to sink an excess current on the output to ground.

9. A system comprising the electronic device of claim 1 and a powered device coupled to the output of the electronic device.

10. A power management method for use in an electronic device, comprising:
    extracting, by a first power extraction unit of the electronic device, a first amount of power from a radio frequency, RF, field present on an RF antenna and providing said first amount of power to one or more circuits of the electronic device;
    extracting, by a second power extraction unit of the electronic device, a second amount of power from the RF field and providing said second amount of power to an output of the electronic device;
    controlling, by a control unit of the electronic device, the second amount of power provided to said output, wherein said controlling comprises controlling the second amount of power provided to the output in dependence on the strength of the RF field.

11. The method of claim 10, wherein said controlling comprises sinking current from a plurality of diodes of the second power extraction unit.

12. The method of claim 10, wherein said controlling comprises sinking, by a limiter of the control unit, an excess current on the output to ground.

13. A non-transitory computer-readable medium comprising executable instructions which, when executed, carry out or control the method of claim 10.

* * * * *